(12) United States Patent
Sato

(10) Patent No.: US 8,692,492 B2
(45) Date of Patent: Apr. 8, 2014

(54) LEAD ANGLE VALUE SETTING METHOD, MOTOR DRIVING CONTROL CIRCUIT, AND BRUSHLESS MOTOR

(75) Inventor: Daisuke Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/821,916

(22) PCT Filed: Feb. 29, 2012

(86) PCT No.: PCT/JP2012/001371
§ 371 (c)(1),
(2), (4) Date: Mar. 8, 2013

(87) PCT Pub. No.: WO2012/132231
PCT Pub. Date: Oct. 4, 2012

(65) Prior Publication Data
US 2013/0170951 A1 Jul. 4, 2013

(30) Foreign Application Priority Data

Mar. 30, 2011 (JP) .................................. 2011-075009

(51) Int. Cl.
*H02P 6/16* (2006.01)
(52) U.S. Cl.
USPC . 318/400.12; 318/437; 318/685; 318/400.14; 318/254; 74/821; 74/823; 74/827; 123/406.24; 123/90.15; 123/406.32; 123/406.57; 123/90.17
(58) Field of Classification Search
USPC .................. 318/400.04, 400.12, 437, 400.14, 318/400.35, 700, 433, 400.02, 729, 812, 318/400.01, 400.13, 715, 721, 400.15, 599, 318/432; 123/406.24, 6.56, 90.15, 90.17, 123/406.32, 406.57; 74/821, 823, 827
See application file for complete search history.

(56) References Cited

U.S. PATENT DOCUMENTS

| 5,457,375 | A | | 10/1995 | Marcinkiewicz et al. |
| 5,715,792 | A | * | 2/1998 | Nozue et al. ............. 123/406.64 |

(Continued)

FOREIGN PATENT DOCUMENTS

| EP | 1 542 351 A2 | 6/2005 |
| JP | 06-284782 A | 10/1994 |

(Continued)

OTHER PUBLICATIONS

International Search Report for International Application No. PCT/JP2012/001371, dated May 29, 2012, 2 pages.

(Continued)

*Primary Examiner* — Shawki S Ismail
*Assistant Examiner* — Jorge L Carrasquillo
(74) *Attorney, Agent, or Firm* — Brinks Gilson & Lione

(57) ABSTRACT

A method for setting a lead-angle value of a motor drive control circuit is disclosed. The motor drive control circuit energizes and drives the windings of a motor with an energizing timing based on a stored lead-angle value. The method includes the steps of: rotating a rotor at a given rpm (step S102), energizing and driving the windings during the rotation at the given rpm with the lead-angle value being switched (step S110); calculating an average value of current amount that energizes and drives the windings (step S114); calculating a total value of consecutive multiple average values for each lead-angle value (step S120); finding a smallest total value among the total values, and setting a lead-angle value corresponding to the smallest total value as a stored lead-angle value (step S122).

9 Claims, 8 Drawing Sheets

(56) References Cited

U.S. PATENT DOCUMENTS

| | | | |
|---|---|---|---|
| 2004/0145330 A1* | 7/2004 | Maslov et al. | 318/437 |
| 2006/0152187 A1* | 7/2006 | Harada et al. | 318/685 |
| 2007/0222402 A1* | 9/2007 | Hochhausen et al. | 318/254 |

FOREIGN PATENT DOCUMENTS

| | | |
|---|---|---|
| JP | 10-127086 A | 5/1998 |
| JP | 2001-008486 A | 1/2001 |
| JP | 2003-106618 A | 4/2003 |
| JP | 2006-515150 A | 5/2006 |
| JP | 2009-261146 A | 11/2009 |

OTHER PUBLICATIONS

Supplementary European Search Report in corresponding European Application No. 12 76 3402, dated Nov. 28, 2013, 6 pages.

* cited by examiner

LEAD ANGLE VALUE SETTING METHOD, MOTOR DRIVING CONTROL CIRCUIT, AND BRUSHLESS MOTOR

This application is a 371 application of PCT/JP2012/001371 having an international filing date of Feb. 29, 2012, which claims priority to JP2011-075009 filed Mar. 30, 2011, the entire contents of which are incorporated herein by reference.

TECHNICAL FIELD

The present invention relates to a method for setting a lead-angle value of a brushless motor to be used in an air blower of a fan motor or a blower, it also relates to a motor drive control circuit that drives and controls a motor based on the lead-angle value set by the same method, and also relates to a brushless motor including the motor drive control circuit.

BACKGROUND ART

The brushless motor generally includes a position sensor for detecting a rotational position of a rotor, of which rotational position and rpm can be controlled by driving the windings of a stator with an energizing timing determined by positional information detected by the position sensor. However, a misalignment of the position sensor from a given position will invite a failure in achieving accurate rotational control over the brushless motor, thereby lowering a rotational efficiency or increasing a rotational sound.

To overcome these problems, a technique has been proposed such as positional information supplied from the position sensor is corrected to an appropriate energizing timing before the windings are driven (e.g. refer to Patent Literature 1.) This conventional technique is embodied by providing the motor control circuit with a motor current detecting means and a correcting means for correcting an energizing timing. The motor control circuit performs a control such that a motor current value detected by the motor current detecting means should be minimized as well as the correcting means should correct the energizing timing. To be more specific, the motor control circuit searches optimum phase correction amounts in every possible operating state, and then stores these amounts in a memory. The motor is driven by using the phase correction amounts stored in the memory, and then the correction amounts are fluctuated appropriately for finding an optimum phase correction value that allows minimizing the motor current value. In other words, a conventional motor control circuit drives a motor with a lead-angle amount (a lead-angle advancing a phase of motor current) that reduces a motor current.

The structure of the foregoing conventional instance allows minimizing an adverse effect caused by dispersions in a circuit constant, a motor winding constant, a DC voltage, and a motor current, whereby the rotational control of the motor can be done steadily.

However, as the forgoing conventional instance tells, although a minimum value of motor current is tried to detect, it cannot be accurately detected. FIG. 9A shows a theoretical relation of characteristics between a lead-angle amount corresponding to an energizing timing and a motor current. As shown in FIG. 9A, the characteristics bows downward while the lead-angle amount is changed with an rpm kept constant, and a minimum value of the motor current is found. In other words, driving the windings with the lead-angle amount at which the motor current value is minimized allows the motor to be driven efficiently. FIG. 9B shows instances of measuring the motor current value while the lead-angle amount is changed with an rpm kept constant. As shown in FIG. 9B, the measurement of the motor current value proves it is difficult to obtain the theoretical characteristics of the downward bow. In other words, the motor current value close to the minimum value is susceptible to noise comparing with a large current, and a change in current value relative to a change in the energizing timing is small. As a result, the minimum value of the motor current is difficult to detect during the measurement of the motor current. The conventional structure thus sometimes fails in achieving an optimum phase correction amount or sometimes produces sound noises due to frequent changes in the phase correction amount.

Patent Literature 1: Unexamined Japanese Patent Application No. H06-284782

DISCLOSURE OF THE INVENTION

A method for setting a lead-angle value of the present invention sets the lead-angle value of a motor driving device that energizes and drives the windings of a brushless motor with an energizing timing based on the lead-angle value having been set and stored. The brushless motor includes a stator wound with the windings and a rotor confronting the stator.

The method comprises the steps of:
rotating the rotor at a given rpm;
energizing and driving the windings while switching the lead-angle value during the rotation of the rotor at the given rpm;
calculating an average value of an electric current amount that energizes the windings with a correlation established to each of lead-angle values being switched;
calculating a total value of the average value corresponding to one of the lead-angle values and other average values before and after the average value, where the total values are calculated for each of the lead-angle values;
finding a smallest total value among the respective total values; and
setting a lead-angle value corresponding to the smallest total value as the stored lead-angle value applied to the rpm.

The structure discussed above allows calculating an average current value based on an actually measured value, and extracting a lead-angle value that minimizes this average value as a stored lead-angle value, thereby accommodating adverse effect caused by dispersions produced in assembling steps. The lead-angle amount that minimizes the motor current thus can be obtained accurately, so that the motor current in operation can be accurately controlled for lowering the noises.

The method for setting a lead-angle value of the present invention can be applied to the brushless motor further including a fan mounted on a rotary shaft, and an air rectifying member is disposed on a blow-off side or a suction side of the fan, and the method carries out each of the steps discussed above.

In the case of applying the method for setting the lead-angle value to a fan motor, the foregoing structure allows reducing variation in a load applied to the fan, so that the lead-angle value to be stored can be obtained with more ease.

A motor drive control circuit of the present invention includes a function that carries out the method for setting a lead-angle value, and drives the motor with a lead angle obtained based on the stored lead-angle value.

The foregoing structure allows driving the motor with a lead-angle value that minimizes the motor current accurately, so that lower noises of the motor can be expected.

A brushless motor of the present invention includes or incorporates the motor drive control circuit. This structure allows driving the brushless motor with a lead angle that minimizes the motor current, so that lower noises of the motor can be expected.

EMBODIMENTS FOR CARRYING OUT INVENTION

A method for setting a lead-angle value, a motor drive control circuit, and a brushless motor of the present invention are demonstrated hereinafter with reference to the accompanying drawings.

Exemplary Embodiment 1

Figure 1:
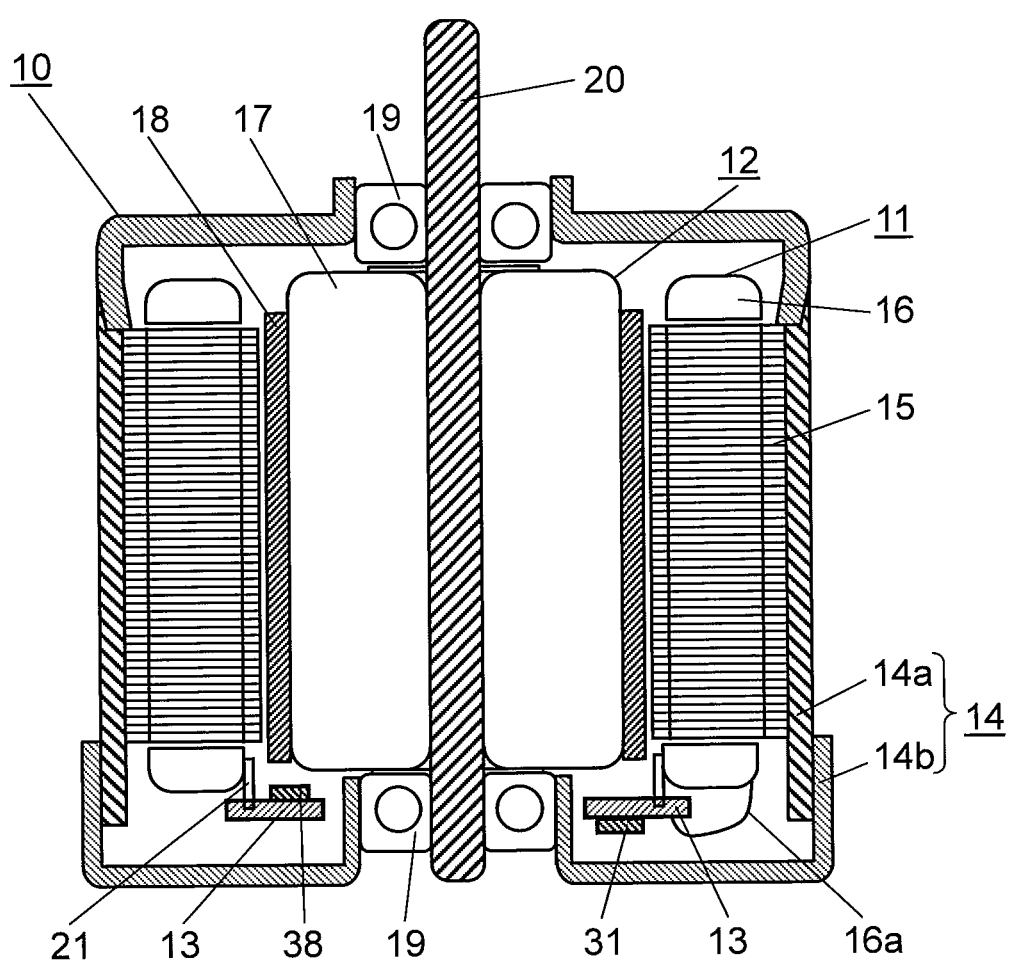
FIG. 1 is a sectional view of a brushless motor in accordance with a first embodiment of the present invention.

FIG. 1 is a sectional view of brushless motor 10 in accordance with the first embodiment. This embodiment employs an inner-rotor type brushless motor, i.e. the rotor is disposed rotatably inside the stator. The brushless motor includes windings of multiple phases, and each phase is driven and rotated by a signal having undergone a pulse width modulation (PWM).

As shown in FIG. 1, brushless motor 10 includes stator 11, rotor 12, circuit board 13, and motor housing 14. Housing 14 is made of metal in a cylindrical shape and hermetically sealed. Housing 14 accommodates stator 11, rotor 12, and circuit board 13 therein for completing brushless motor 10. Housing 14 is formed of housing body 14a and housing cover 14b, which is mounted onto housing body 14a, thereby generally sealing housing 14.

Stator 11 has stator iron core 15 wound with windings 16 for each phase. This embodiment employs three phases, namely phases U, V, and W different from each other by 120°. Stator iron core 15 includes multiple salient poles protruding inward, and its outer wall shapes like a cylinder and is fixed to housing body 14a.

Rotor 12 is disposed inside stator 11 with a space therebetween, and holds cylindrical permanent magnets 18 on an outer wall of rotor frame 17. Rotor 12 is disposed rotatably on rotary shaft 20 supported by bearing 19. In other words, tip faces of the salient poles of stator iron core 15 confront an outer wall of permanent magnet 18.

On top of that, circuit board 13, to which various circuit components 31 are mounted, is accommodated in housing 14 of brushless motor 10. Those circuit components 31 form a drive control circuit that controls and drives the motor. Circuit board 13 includes also position sensor 38 formed of, e.g. Hall elements, for detecting a rotational position of rotor 12. Stator iron core 15 is mounted with support member 21, through which circuit board 13 is fixed inside the housing 14. Phases U, V, and W have respective winding ends as lead-wires 16a, which are led out from stator 11 and connected to circuit board 13.

To obtain the foregoing structure, the following process is executed: First, insert stator 11 into housing body 14a and fix it on an inner wall of housing body 14a, then accommodate rotor 12 and circuit board 13 in housing body 14a, and then rigidly mount housing cover 14b to housing body 14a, thereby completing brushless motor 10 that integrates the position sensor and the drive control circuit. The drive control circuit can be incorporated into brushless motor 10. Since motor housing 14 is made of metal, shielding effect can be expected, so that the electromagnetic noises radiated from circuit board 13 and stator 11 to the outside can be reduced. Stator iron core 15 is directly fixed to housing body 14a, so that the heat produced by stator 11 can dissipate to the outside via motor housing 14 made of metal.

Figure 2:
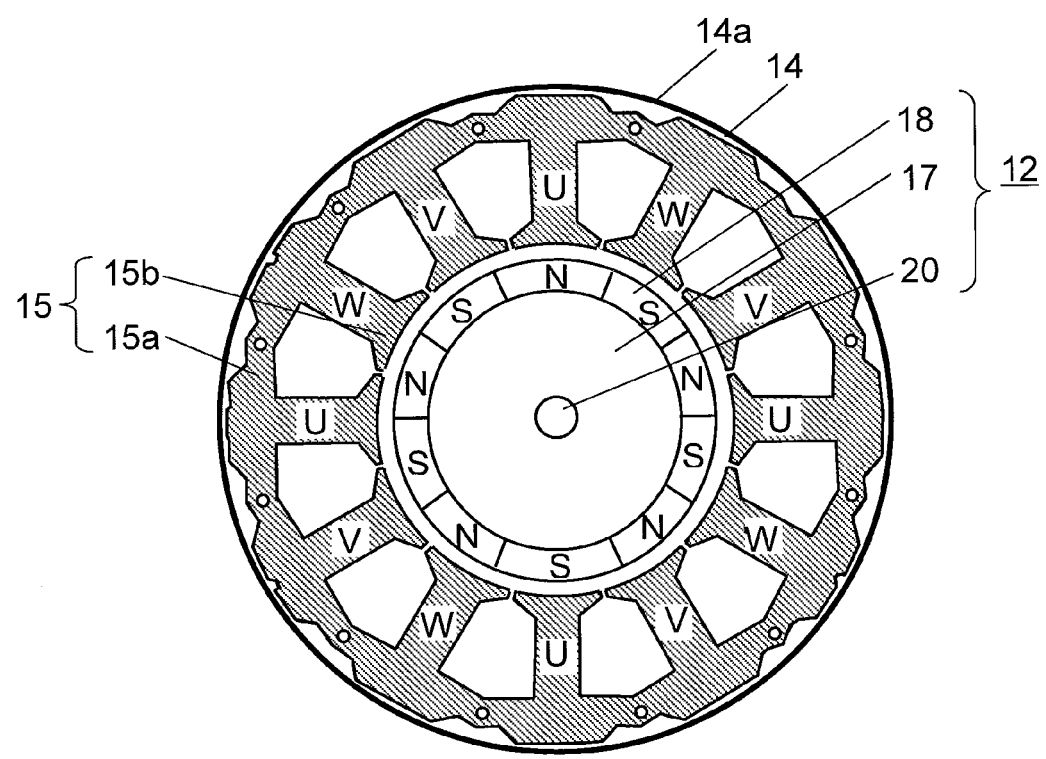
FIG. 2 is a plan view of an inside of a motor housing, viewed from a top, of the brushless motor shown in FIG. 1.

FIG. 2 is a plan view of the inside of motor housing 14 of brushless motor 10 in accordance with this embodiment. In FIG. 2, stator iron core 15 is exhibited without being wound with windings 16, and the positional relation between stator iron core 15 and permanent magnets 18 is illustrated. As FIG. 2 shows, stator iron core 15 is formed of annular yoke 15a and teeth 15b working as salient poles. This embodiment shows an example that employs 12 salient poles, namely, 12 teeth 15b. The outer wall of this stator iron core 15 is fixed to the inner wall of housing body 14a. Respective teeth 15b protrusively extend inward and are placed along the circumferential direction at equal intervals while they form slots, i.e. spaces between teeth 15b. Teeth 15b are addressed to phases U, V, and W sequentially. Each one of teeth 15b addressed to phase U is wound with winding 16 of phase U, and each one of teeth 15b addressed to phase V is wound with winding 16 of phase V, and each one of teeth 15b addressed to phase W is wound with winding 16 of phase W. Rotor 12 is disposed inside stator iron core 15 with the tips of 12 teeth 15b confronting rotor 12. Rotor 12 holds permanent magnets 18 magnetized equidistantly along the circumferential direction such that pole S alternates with pole N. In this embodiment, as shown in FIG. 2, permanent magnets 18 are magnetized ten (10) poles, i.e. five pairs of pole S and pole N, along the circumferential direction. Brushless motor 10 thus has 10 poles and 12 slots.

Brushless motor 10 discussed above receives a power supply voltage and control signals from the outside, so that the control circuit and the drive circuit on circuit board 13 supply a drive current to windings 16, and then stator iron core 15 generates a magnetic field. The magnetic field from stator iron core 15 and magnetic fields from permanent magnets 18 generate attraction force and repulsion force in response to the polarities of those magnetic fields. Those forces rotate rotor 12 on rotary shaft 20.

Figure 3:
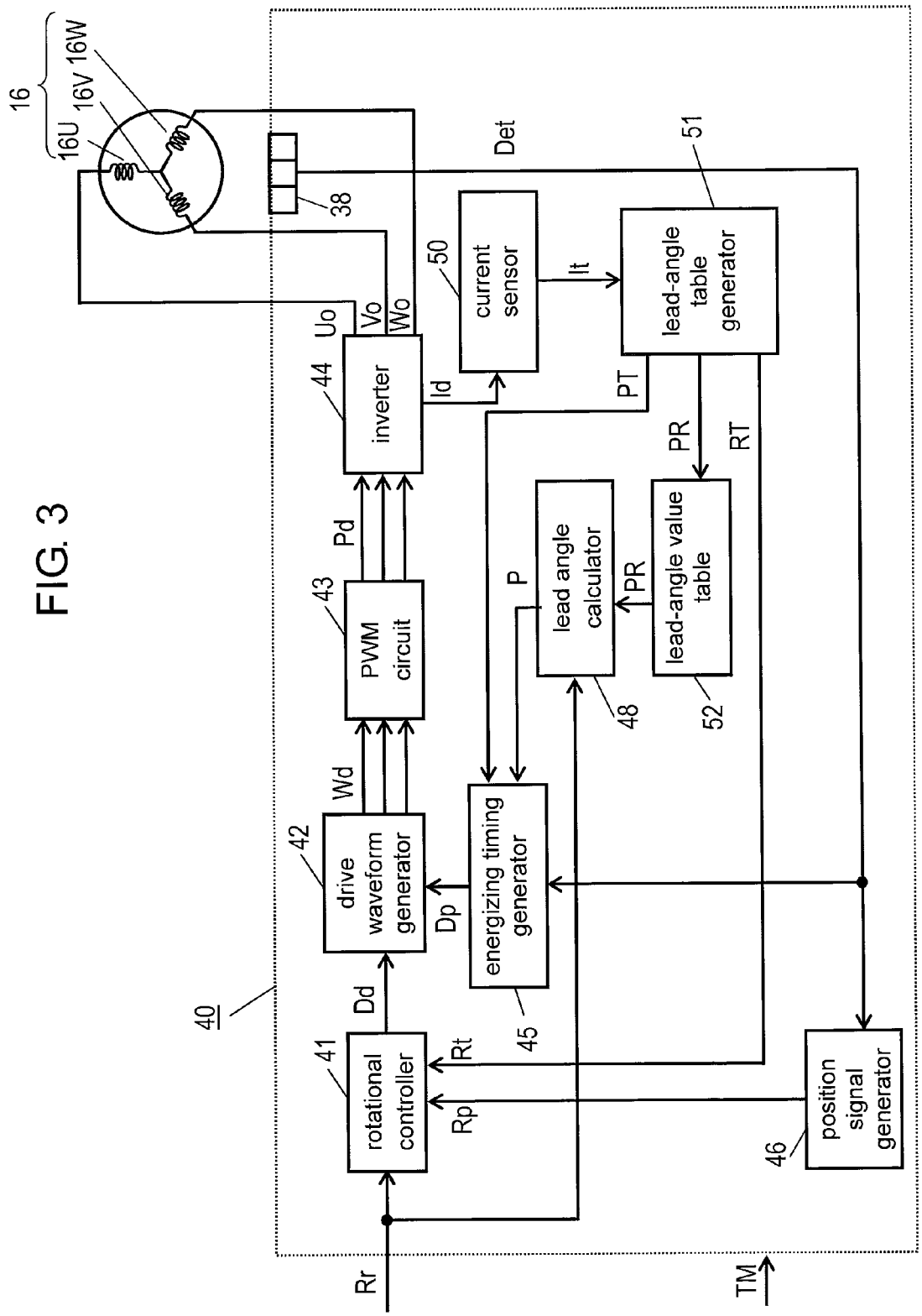
FIG. 3 is a block diagram of a motor drive control circuit of the brushless motor.

The motor drive control circuit is detailed hereinafter. This circuit is formed of a position sensor 38 and circuit components 31 mounted on circuit board 13. FIG. 3 is a block diagram of the motor drive control circuit 40 (hereinafter referred to as a drive control circuit) of brushless motor 10 in accordance with this embodiment.

Drive control circuit 40 includes position sensors 38 corresponding to three phases, rotational controller 41, drive waveform generator 42, PWM circuit 43, inverter 44, energizing timing generator 45, position signal generator 46, lead-angle calculator 48, current sensor 50, lead-angle table generator 51, and lead-angle value table 52. Drive control circuit 40 receives rotational command signal Rr from an external device of higher order. Signal Rr gives, e.g. an instruction of rpm.

Rotational controller 41 receives rotational command signal Rr and also sensed position signal Rp produced by position signal generator 46. Sensed position signal Rp is basically produced in response to detection of a rotational position of rotor 12. Based on rotational command signal Rr and sensed position signal Rp, rotational controller 41 generates rotational control signal Dd that shows a drive amount of windings 16.

To be more specific, rotational controller 41 finds a speed deviation between rotational command signal Rr that shows a speed instruction and a detected speed that is obtained by differential operation from sensed position signal Rp. Then rotational controller 41 generates rotational control signal Dd that shows an amount of torque in response to the speed deviation such that an actual speed follows the speed instruction. Rotational controller 41 supplies this rotational control signal Dd to drive waveform generator 42.

Drive waveform generator 42 generates waveform signal Wd, which drives windings 16, for each phase, and supplies waveform signal Wd to PWM circuit 43. In the case of driving windings 16 in a sinusoidal pattern, waveform signal Wd forms a sinusoidal waveform signal, and in the case of driving windings 16 in a square pattern, waveform signal Wd forms a square waveform signal. An amplitude of waveform signal Wd is determined by rotational control signal Dd. The timing of supplying waveform signal Wd to PWM circuit 43 is determined in response to energizing phase signal Dp produced by energizing timing generator 45. When the timing in response to energizing phase signal Dp has a phase advancing relative to a reference timing, the timing has a lead angle, and when the timing has a phase delaying relative to the reference timing, the timing has a delay angle.

PWM (pulse width modulation) circuit 43 uses waveform signal Wd supplied from drive waveform generator 42 to each phase as a modulating signal, and carries out the pulse width modulation respectively. PWM circuit 43 supplies drive pulse signal Pd, which forms a signal of pulse row having undergone the PWM done by waveform signal Wd, to inverter 44.

Inverter 44 energizes windings 16 of each phase based on drive pulse signal Pd for driving windings 16. Inverter 44 includes switching elements connected to either one of the negative pole or the positive pole of the power supply for phases U, V, and W respectively. The switching elements are connected with each other at opposite sides to the power supply, and the connected sections work as output terminals from inverter 44 for driving windings 16. Output terminal Uo for phase U is connected to windings 16U, output terminal Vo for phase V is connected to windings 16V, and output terminal Wo for phase W is connected to windings 16W via lead-wire 16a respectively. In each phase, when the switching elements are turned on or off by drive pulse signal Pd, a drive current of the power supply flows from the output terminals to windings 16 via the turned-on switching elements. Since drive pulse signal Pd is formed by modulating waveform signal Wd by the PWM method, turning on or off the respective switching elements allows the drive current in response to waveform signal Wd to energize the respective windings 16.

The foregoing structure allows forming a feedback control loop that controls the rpm and the rotational position of rotor 12 in response to rotational command signal Rr.

Next, a structure for generating detected position signal Rp and energizing phase signal Dp is described hereinafter. First, position sensor 38 mounted on circuit board 13 senses a change in magnetic pole of permanent magnet 18 of rotating rotor 12, and outputs position sensing signal Det, which is supplied to energizing timing generator 45 and position signal generator 46.

Position signal generator 46 uses position sensing signal Det for generating detected position signal Rp, and supplies this signal to rotational controller 41. Energizing timing generator 45 generates a timing shifted from the reference timing by a certain lead-angle amount. Energizing timing generator 45 receives lead-angle value P from lead-angle calculator 48 as an amount of lead angle, and then generates energizing phase signal Dp showing a timing advanced from a reference timing by lead-angle value P. This energizing phase signal Dp is supplied to drive waveform generator 42. As a result, drive waveform generator 42 outputs waveform signal Wd at a timing advanced from the reference timing by energizing phase signal Dp, where the reference timing is obtained based on a position sensing signal Det.

To generate lead-angle value P, drive control circuit 40 includes lead-angle value table 52 and lead-angle calculator 48. On top of that, this embodiment has lead-angle table generator 51 for generating lead-angle value table 52.

Lead-angle value table 52 stores lead-angle values each of which is addressed to an rpm (rotation per minute, rotation speed) and is best for the addressed rpm. In this embodiment, lead-angle values that minimize the motor current at respective rpm are stored as stored lead-angle values.

Lead-angle calculator 48 receives rotational command signal Rr, and reads lead-angle value PR corresponding to an rpm in the vicinity of rotational command signal Rr from lead-angle value table 52. Lead-angle calculator 48 then uses lead-angle value PR read from table 52 for calculating lead-angle value P corresponding to rotational command signal Rr by, e.g. a spline interpolation method. Lead-angle value P thus obtained is supplied to energizing timing generator 45. In the following descriptions, multiple lead-angle values set in lead-angle value table 52 are referred to as the stored lead-angle values PR, and a lead-angle value calculated by using stored lead-angle values PR is referred to as lead-angle value P.

During the rotating operation of brushless motor 10, when drive control circuit 40 discussed above receives rotational command signal Rr, lead-angle calculator 48 refers to lead-angle value table 52 and calculates lead-angle value P that minimizes the motor current. Energizing timing generator 45 supplies energizing phase signal Dp, in which the phase is shifted by lead-angle value P, to drive waveform generator 42, which then supplies waveform signal Wd to PWM circuit 43 at a timing where a phase is shifted from the reference timing by lead-angle value P. Drive control circuit 40 operates as discussed above, thereby driving brushless motor 10 in response to rotational command signal Rr such that the motor current can be minimized at the rpm instructed by signal Rr. Brushless motor 10 thus rotates to minimize the motor current, so that minimum torque is needed for the operation and thus the motor noises can be reduced.

On top of that, drive control circuit 40 further includes current sensor 50 and lead-angle table generator 51 for generating lead-angle values to be stored in lead-angle value table 52. Current sensor 50 detects current amount Id supplied to inverter 44, and notifies lead-angle table generator 51 of the detected amount Id as current value It. Lead-angle table generator 51 uses current values It notified for setting an optimum lead-angle value for the rpm as stored lead-angle value PR in lead-angle value table 52.

Drive control circuit 40 receives lead-angle setting signal TM from an external device of higher order, and follows the instruction given by this signal TM about setting a lead angle by using chiefly lead-angle table generator 51. This operation of setting a lead-angle value is carried out in a step of adjusting respective motors after the motors are assembled as shown in FIG. 1. Setting a lead-angle value to the respective motors individually will accommodate adverse effect produced by dispersions in mounting position sensor 38 or dispersions in characteristics of windings 16 and in magnetic characteristics of the permanent magnets. As a result, an optimum lead-angle value can be set to individual motors.

Next, the method for setting the lead-angle value carried out in drive control circuit 40 is demonstrated hereinafter. When drive control circuit 40 receives lead-angle setting signal TM, circuit 40 carries out the operation of setting the lead-angle value as follows: First, lead-angle table generator 51 gives a command of rpm RT to rotational controller 41 by using rotational command signal Rt corresponding to rotational command signal Rr, and also controls energizing timing generator 45 about an energizing timing by using lead-angle value PT corresponding to lead-angle value P. In other words, rotational controller 41 operates with rotational command signal Rt instead of rotational command signal Rr, and energizing timing generator 45 operates with lead-angle value PT instead of lead-angle value P. Lead-angle table generator 51 detects current values It sequentially, and produces stored lead-angle values PR based on detected current values It, which are then set in lead-angle value table 52. Those mechanisms allow drive control circuit 40 to energize and drive windings 16 at the energizing timing based on lead-angle value PR stored in lead-angle value table 52. The lead-angle value to be supplied to energizing timing generator 45 for generating lead-angle value PR to be stored is described hereinafter as foregoing lead-angle value PT.

Lead-angle value PR to be stored is set in lead-angle value table 52 by the following method: First, lead-angle table generator 51 rotates brushless motor 10 at a given rpm RT (=RT0) by using rotational command signal Rt. During the rotation at this given rpm RT (=RT0), detect current values It while lead-angle value PT is changed sequentially, and find the lead-angle value PR (=PR0) that minimizes the motor current. After the chain of the foregoing operations, lead-angle table generator 51 rotates brushless motor 10 at next rpm RT (=RT1) by using rotational command signal Rt to find a next lead-angle value PR (=PR1). Lead-angle table generator 51 repeats these operations to find optimum lead-angle values PR to be stored corresponding to the respective rpm RT, and store them in lead-angle value table 52.

Figure 4:
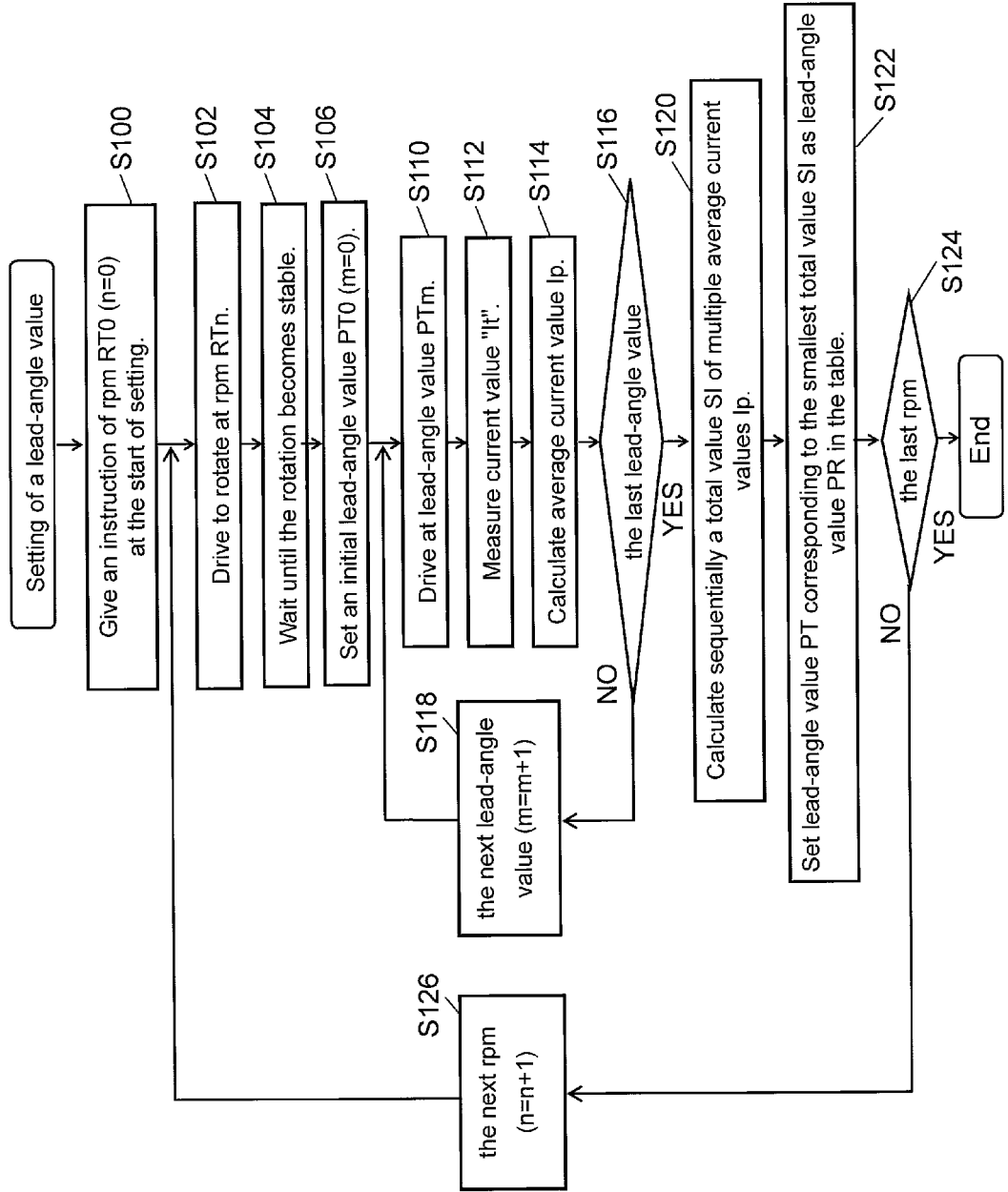
FIG. 4 is a flowchart illustrating a method for setting a lead-angle value in accordance with the first embodiment.
Figure 5:
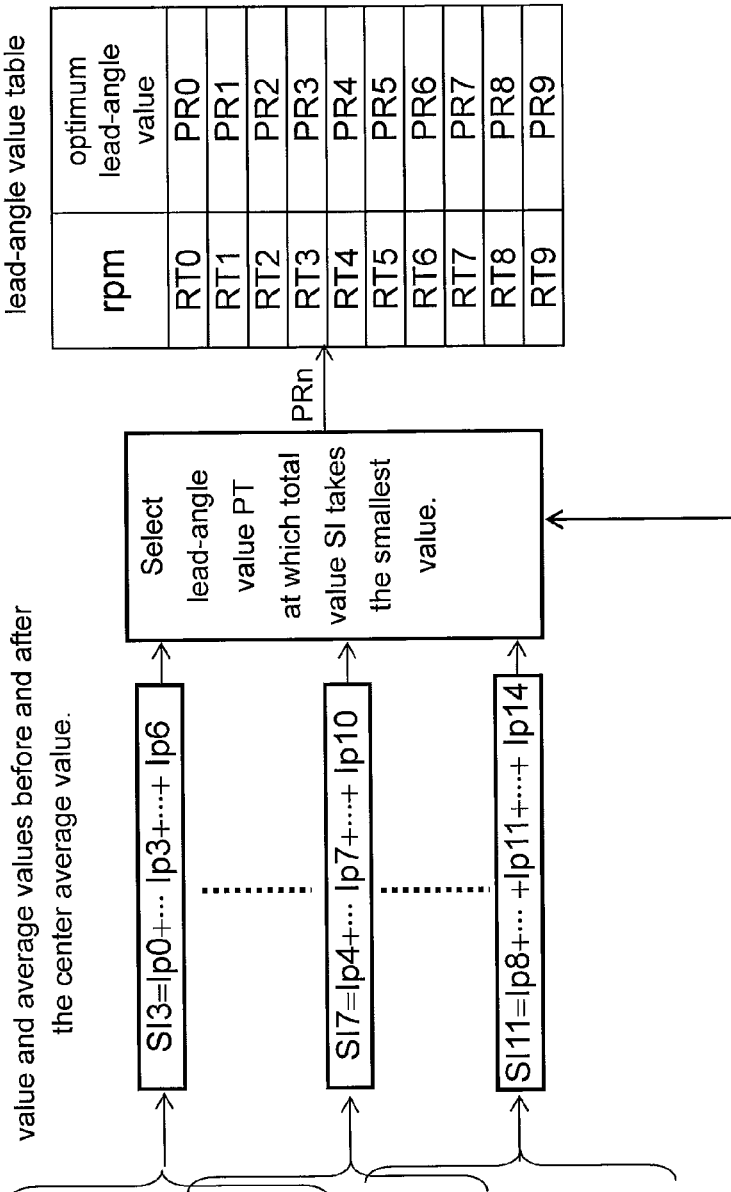
FIG. 5 details the method for setting a lead-angle value, and the method calculates a lead-angle value to be stored.

FIG. 4 is a flowchart detailing the method for setting the lead-angle value. FIG. 5 details how to calculate the optimum lead-angle value PR to be stored. The method for setting the lead-angle value in accordance with the embodiment is demonstrated hereinafter with reference to FIG. 4 and FIG. 5. Rpm RT is changed from RT0, RT1, RT2 ... to RT9, namely, it is changed ten steps, and this example finds ten lead-angle values PR0-PR9 to be stored corresponding to respective rpm RT. Respective lead-angle values PR0-PR9 are hereinafter referred to simply as lead-angle value PR. To be more specific, set the rpm RT sequentially like RT0=200 (rpm), RT1=300, and onward, and find lead-angle value PR0=5° (electric angle) for RT0=200. In this case, lead-angle amount 5° (electric angle) is best for rpm=200.

In FIG. 4, the start of setting the lead-angle value prompts lead-angle table generator 51 to give an instruction to rotational controller 41 that the initial rpm RT=rpm RT0 should be used at the start of this operation (step S100). Brushless motor 10 thus starts being driven to reach rpm=RT0 (step S102), while generator 51 stays on standby until brushless motor 10 reaches stable rpm=RT0 (step S104).

When brushless motor 10 reaches stable rpm=RT0, lead-angle table generator 51 firstly sets lead-angle value PT0 as an initial value to energizing timing generator 45 (step S106). This setting prompts energizing timing generator 45 to supply energizing phase signal Dp, which shows the timing of lead-angle value PT0, to drive waveform generator 42, whereby brushless motor 10 is driven at rpm=RT0 with a phase advanced by lead-angle value PT0 (step S110).

In this driving state, lead-angle table generator 51 measures current values It a given number of times, for instance 1000 times (step S112). On top of that, lead-angle table generator 51 calculates an average current value Ip of current values It measured the given number of times (step S114). In the following descriptions, average current value Ip at lead-angle value PT0 is referred to as average current value Ip0, and referred to as average current value Ip1 at lead-angle value PT1, and Ipm at lead-angle value PTm.

Lead-angle table generator 51 determines whether or not the present lead-angle value PT is the last one, and in the case of the present value PT being not the last one, the step moves on to step S118, and in the case of the present value PT being the last one, the step moves on to step S120 (step S116). In other words, for instance, when the lead-angle value ends at initial lead-angle value PT0, table generator 51 sets the next lead-angle value PT1 with rpm RT kept at the same speed (step S118), and the step advances to step S110. Then the motor 10 is driven with the phase advancing by the new lead-angle value PT1, and table generator 51 calculates average current value Ip1 corresponding to lead-angle value PT1.

FIG. 4 shows an example of the loop process repeated from lead-angles PT0 to PTm. FIG. 5 shows a table listing average current values, and this table is an example formed through this process. In this table, lead-angle value PT is set from PT0=19° to PT14=33° at intervals of 1°. The average current value Ip is calculated as from Ip0=119 A to Ip14=133 A. To be more specific, the average current values table shown in FIG. 5 indicates that, when lead-angle value is set at 19°, the average current value Ip obtained is 119 A.

The loop process done in step S110 through step S116 calculates the average current values Ip corresponding to respective lead-angle values PT, then consecutive multiple average current values Ip are shifted sequentially and summed up to respective total values SI as a moving average would be calculated (step S120). In other words, the average current value Ip at a center and a given number of average current values Ip before and after the center average current value Ip are summed up to total value SI, and this process is done sequentially while a target group of the average values is shifted one by one. FIG. 5 shows an instance where the total values SI of consecutive seven average current values Ip are calculated as described above. For instance, in the case of total value SI is SI3, the center average current value Ip3 and three average current values respectively before and after the current value Ip3, namely, total of Ip0–Ip6=SI3 is calculated. Then total value SI4 of Ip1–Ip7 is calculated. Repeat this operation to find total values SI, i.e. SI3 through SI11. The lead-angle value PT corresponding to the center average current Ip is addressed to total value SI. For instance, total value SI3 corresponds to lead-angle value PT3, and total value SI4 corresponds to lead-angle value PT4.

Then lead-angle table generator 51 searches the multiple total values SI for the minimum total value SI, and extracts lead-angle value PT corresponding to the minimum total value SI. The extracted lead-angle value PT is addressed to its rpm RT and is set as lead-angle value PR in lead-angle value table 52 (step S122). In other words, the setting method in accordance with this embodiment sets lead-angle value PT corresponding to the minimum total value SI as lead-angle value PR best for rpm RT, and lists it in lead-angle value table 52. For instance, in FIG. 5, at rpm RT0, assume that total value SI7 is the smallest one among total values SI3 through SI11, then lead-angle value PT7 corresponding to total value SI7 is extracted, and then extracted lead-angle value PT7 is addressed to rpm RT0 and is set in lead-angle value table 52 as lead-angle value PR0. In the instance shown in FIG. 5, lead-angle value PT7 is 26°, so that the angle of 26° is set as lead-angle value PR0 corresponding to rpm RT0. In this case, lead-angle amount of 26° is best for minimizing the motor current at rpm RT0.

In FIG. 4, lead-angle table generator 51 determines whether or not the present rpm RT is the last rpm RT, and when the present one is not the last one, the step moves on to step S126, and when the present one is the last one, the process ends (step S124). For instance, when the rotation at rpm RT0 set at the beginning ends, then the next rpm RT1 is set (step S126), and the step moves on to step S102. Then the rpm is changed to rpm RT1 newly set, and brushless motor 10 is driven at this rpm RT1, and lead-angle table generator 51 executes a setting of lead-angle value PR1 corresponding to rpm RT1.

FIG. 4 shows an instance where the foregoing loop process that repeats setting the rpm from RT0 to RTn. The lead-angle value table shown in FIG. 5 is an instance of the table formed through the foregoing process. This table lists lead-angle values PR0 through PR9 corresponding to rpm RT0 through rpm RT9 respectively.

The foregoing method for setting the lead-angle value comprises the steps of:

step S102 for rotating rotor 12 at predetermined rpm RT;

step S110 for energizing and driving windings 16 with lead-angle values PT being switched during the rotation at rpm RT;

step S114 for calculating average current value Ip of current amounts Id that energize windings 16, and respective average current values Ip are addressed to each one of lead-angle values switched-over;

step S120 for calculating the total value SIm, for every lead-angle value PT, of average current value Ipm corresponding to a certain lead-angle value PTm and the average current values before and after the certain lead-angle value PTm, namely, Ip(m−1), Ip(m−2), . . . Ip(m+1), Ip(0+2), . . . ; and step S122 for finding the smallest total value SIx among the total values SI, and setting lead angle value PTx corresponding to the smallest total value SIx as lead-angle value PRx to be stored and addressed to rpm RT.

The method further includes the step of:

step S126 for switching over rpm RT; and step S122 for setting lead-angle values PR to be stored while values PR are addressed to each rpm RT switched over.

As discussed above, the method for setting the lead-angle value of the present invention calculates average current value Ip based on an actual measurement, and extracts the lead-angle value PT that minimizes average current value Ip, and sets the lead-angle value PT extracted as lead-angle value PR to be stored. This method allows accommodating adverse effect produced by dispersions in assembly, e.g. dispersion in the mount position of position sensor 38, and dispersions in characteristics of windings 16 and magnetic characteristics of the permanent magnets. On top of that, the method allows accommodating dispersions in individual motors by setting lead-angle values PR for the respective motors, whereby an optimum lead-angle amount can be set.

Figure 6:
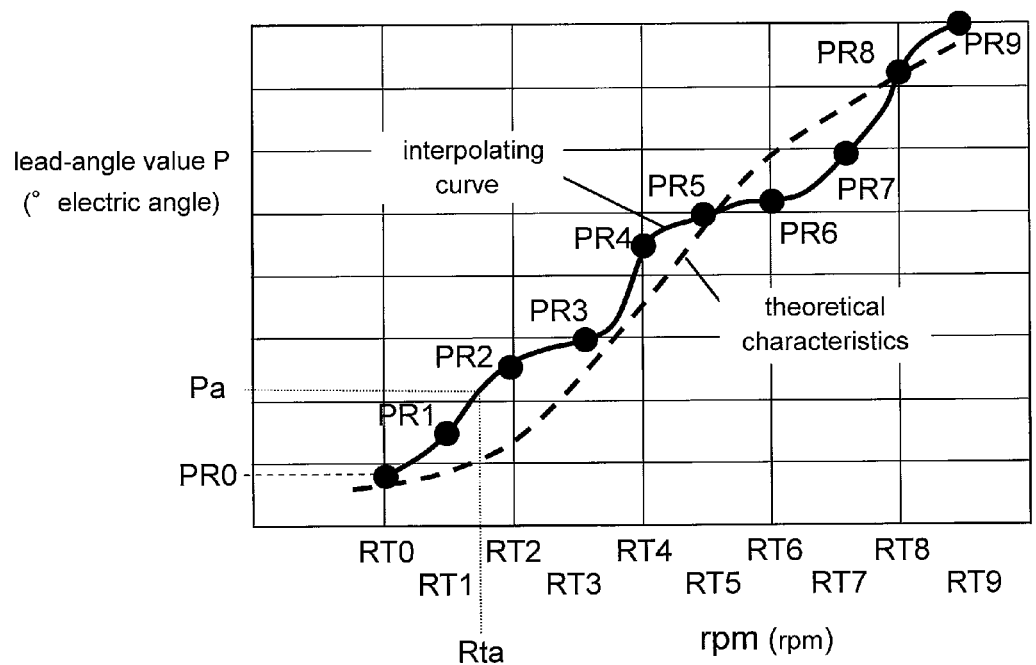
FIG. 6 shows an example of a lead-angle value calculated based on a table of lead-angle values in accordance with the first embodiment.

FIG. 6 shows an instance of lead-angle value P calculated according to lead-angle value table 52. Lead-angle calculator 48 calculates optimum lead-angle value P for each rpm, and the optimum lead-angle values P are dotted and connected by an interpolating curve with solid line in FIG. 6. A theoretical characteristics value is shown with a broken line as a reference.

The foregoing method for setting the lead-angle value allows lead-angle value table 52 to store lead-angle values PR0-PR9 as shown in FIG. 6. During a normal operation of brushless motor 10, lead-angle calculator 48 reads lead-angle value PR, addressed to the rpm in the vicinity of rotational command signal Rr, from lead-angle value table 52, and outputs lead-angle value P corresponding to rotational command signal Rr.

For instance, as shown in FIG. 6, during the normal operation, rotational command signal Rr gives an instruction of rpm Rta, then lead-angle calculator 48 reads lead-angle values PR1, PR2, and PR3 from lead-angle value table 52 as the values corresponding to rpm Rta and its vicinity. Calculator 48 calculates the interpolating curve as shown in FIG. 6 with a third-order spline interpolation method by using those lead-angle values PR1, PR2, and PR3. Lead-angle calculator 48 interpolates the curve based on the interpolating curve, and outputs lead-angle value Pa as lead-angle value P corresponding to rpm Rta. Brushless motor 10 advances the phase by this lead-angle value Pa, and rotates at rpm Rta.

Drive control circuit 40 drives windings 16 with lead-angle value P generated based on optimum stored lead-angle value PR, so that the motor current of brushless motor 10 can be reduced. Since brushless motor 10 is driven such that the motor current can be minimized, the torque can be minimized during the operation, and thus the noises of the motor can be reduced.

A microprocessor can be mounted on circuit board 13, and the function of drive control circuit 40 is programmed in the microprocessor for executing each one of the steps of the foregoing method for setting the lead-angle value and calculating lead-angle value P. This structure allows executing the respective processes including the method for setting the lead-angle value with more flexibility. The method for setting a lead-angle value is carried out in the manufacturing steps of brushless motor 10; however, the method can be modified to be executed at the inspection or the maintenance of brushless motor 10.

Exemplary Embodiment 2

Embodiment 2 refers to an instance of applying the method for setting the lead-angle value discussed in embodiment 1 to a fan motor. To be more specific, a brushless motor in accordance with the second embodiment is a fan motor including a fan that rotates in response to the rotation of the rotor. Structural elements similar to those in the first embodiment use the same reference marks, and detailed descriptions thereof are omitted here.

Figure 7:
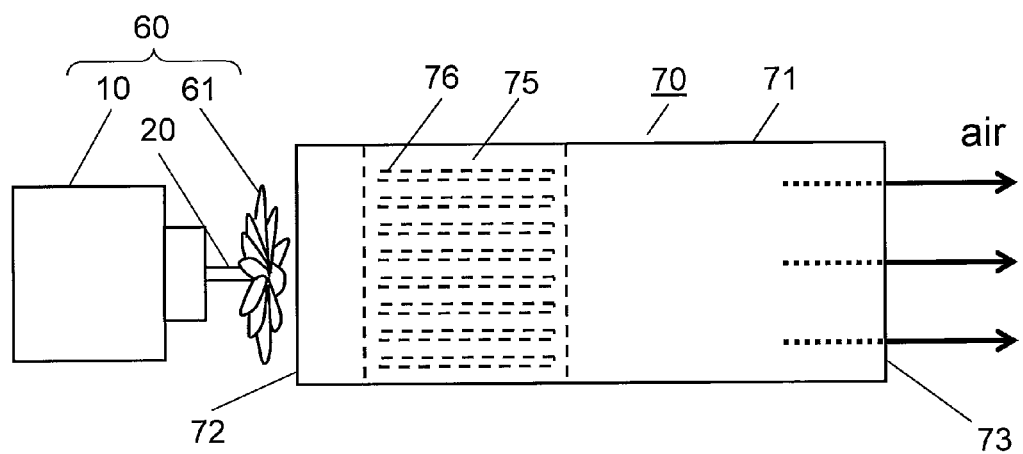
FIG. 7 shows a structure of a method for setting a lead-angle value in accordance with a second embodiment of the present invention.
Figure 8:
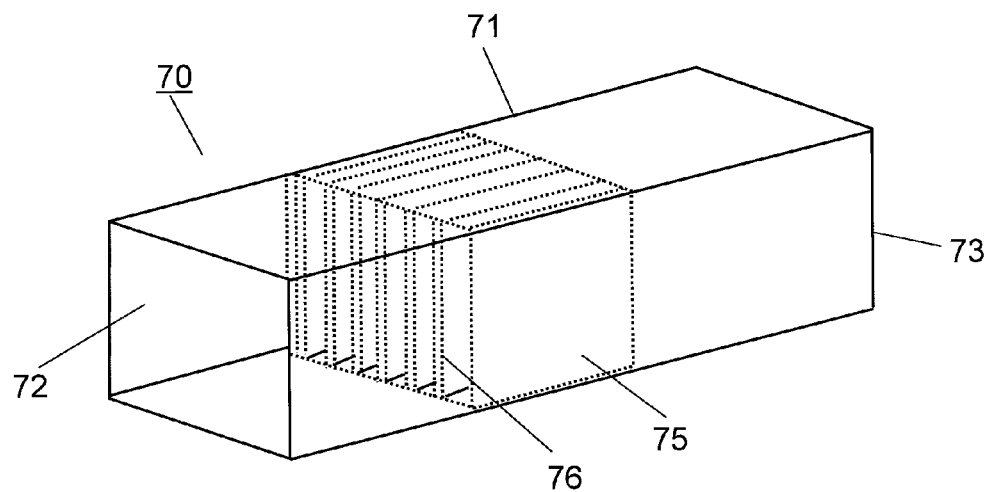
FIG. 8 is a perspective view of an air rectifying member used in the method for setting a lead-angle value in accordance with the second embodiment.
Figure 9A:
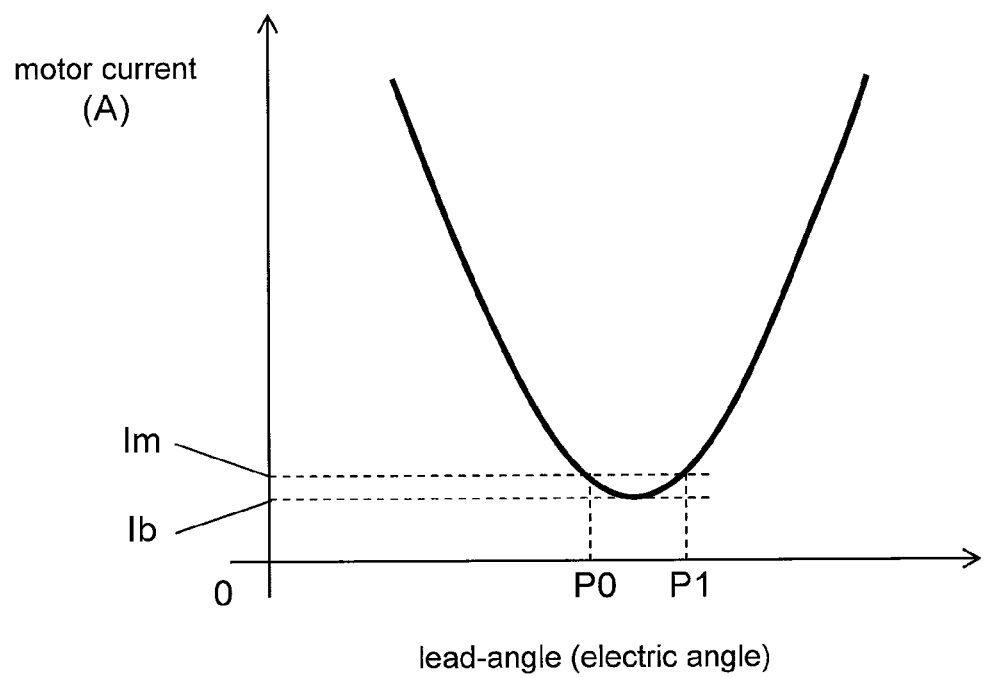
FIG. 9A shows theoretical characteristics of motor currents relative to lead-angle amounts corresponding to energizing timings.
Figure 9B:
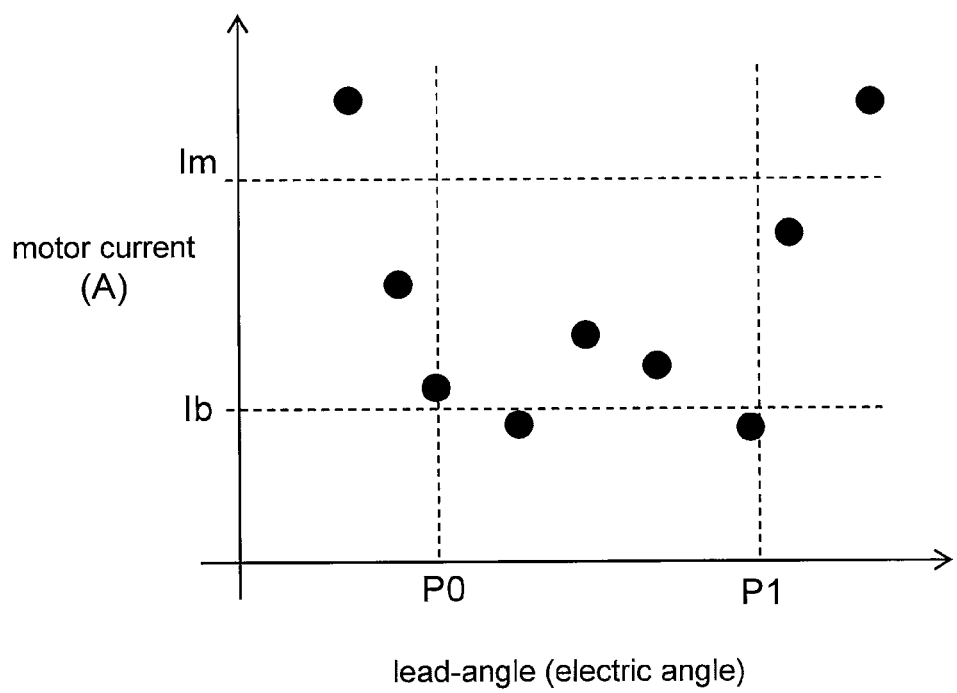
FIG. 9B shows lead-angle amounts and motor currents conventionally measured.

FIG. 7 is a diagram illustrating a method for setting a lead-angle value. FIG. 8 is a perspective view of an air rectifying member in accordance with the second embodiment.

The method for setting the lead-angle value in accordance with the second embodiment is demonstrated hereinafter with reference to FIG. 7 and FIG. 8.

As FIG. 7 shows, brushless motor 60 in accordance with the second embodiment is a fan motor including fan 61 mounted on rotary shaft 20. This embodiment shows the fan motor formed of brushless motor 10 in accordance with the first embodiment and fan 61. Brushless motor 60 equipped with fan 61, and as a matter of course, fan 61 becomes a load to motor 60. As a result, when a lead-angle value is set, the accuracy of lead-angle value PR to be stored is degraded. To be more specific, when lead-angle value PR is set following the method demonstrated in the first embodiment, current amount Id to be detected is subject to variation because the vibration at the tips of blades or air density of fan 61 adversely affects current amount Id, so that lead-angle value PR to be stored tends to deviate from an actual optimum lead-angle value.

To overcome the problem discussed above, air rectifying member 70 is disposed on a suction side or a blow-off side of fan 61 for setting the lead-angle value. The method for setting the lead-angle value in accordance with the second embodiment is executed in the foregoing structure, and follows the procedure shown in FIG. 4 for setting lead-angle value PR to be stored in lead-angle value table 52.

As FIG. 7 and FIG. 8 show, air rectifying member 70 is formed of hollow rectifying member body 71 and draft resistance 75 disposed in rectifying member body 71. Rectifying member body 71 includes sucking port 72 for sucking an airflow from fan 61 and blow-off port 73 for blowing off the airflow. Draft resistance 75 is formed of multiple plate-like fins 76 disposed in parallel to each other. Draft resistance 75 is disposed in rectifying member body 71 such that the air sucked from sucking port 72 can flow to blow-off port 73 through the spaces between fins 76.

When the lead-angle value is set, air rectifying member 70 discussed above is placed on an air blowing side of fan 61, then the airflow from fan 61 can be rectified. To be more specific, draft resistance 75 gives a certain load to the airflow, so that the airflow becomes stable, which reduces the vibration at the tips of blades of fan 61 as well as the change in air density. The change in current amount Id detected by current sensor 50 thus can be reduced. As a result, lead-angle value PR to be stored can be obtained accurately.

As discussed above, this second embodiment proves that use of the method for setting the lead-angle value of the present invention in a fan motor allows obtaining lead-angle value PR to be stored more accurately and easily.

INDUSTRIAL APPLICABILITY

The present invention discloses a method for setting a lead-angle value. This method sets a lead-angle value for controlling a motor current accurately. A motor drive control device and a brushless motor of the present invention use a lead-angle value obtained by this method, so that they are suitable for a fan motor or a blower that requires low-noise operation. They are also useful for motors employed in electric apparatuses that need low-noise operation.

The invention claimed is:

1. A method for setting a lead-angle value of a motor drive control circuit that drives a winding, with an energizing timing obtained based on a stored lead-angle value set in advance, of a brushless motor comprising a stator wound with the winding, and a rotor disposed rotatably and confronting the stator, the method comprising steps of:
   rotating the rotor at a predetermined rpm;
   energizing and driving the winding while switching the lead-angle value during the rotation at the rpm;
   calculating an average value of current amount that energizes the winding with a correlation established to each of lead-angle values being switched;
   calculating a total value of the average value corresponding to one of the lead-angle values and other average values before and after the average value, the total value being calculated for each of the lead-angle values;
   finding a smallest total amount among the total values; and
   setting a lead-angle value corresponding to the smallest total value as the stored lead-angle value applied to the rpm.

2. The method of claim 1 further comprising a step of switching the rpm, wherein the step of setting the lead-angle value sets the stored lead-angle value while correlating the lead-angle value to each of rpms being switched.

3. The method of claim 1, wherein the brushless motor further comprises a fan mounted on a rotary shaft, and the steps are carried out with an air rectifying member disposed on a blow-off side or a suction side of the fan, and the fan rotated.

4. The method of claim 3, wherein the air rectifying member includes a draft resistance formed of a plurality of plate-like fins disposed in parallel to each other.

5. A motor drive control circuit including a function to be executed by the method as defined in claim 1 for driving the motor with a lead angle based on the stored lead-angle value.

6. A brushless motor comprising the motor drive control circuit as defined in claim 5 built-in or integrated therewith.

7. A motor drive control circuit including a function to be executed by the method as defined in claim 1, the drive control circuit comprising:
   a lead-angle table generator for generating the stored lead-angle value;
   a lead-angle value table for storing the stored lead-angle value generated; and
   a lead-angle calculator for calculating a lead-angle amount based on the lead-angle value stored in the lead-angle value table,
   wherein the motor is driven with the lead-angle amount calculated by the lead-angle calculator.

8. The motor drive control circuit of claim 7, wherein the lead-angle calculator calculates the lead-angle value with interpolation using a plurality of the stored lead-angle values applicable to each rpm, and drives the motor with the calculated lead-angle amount.

9. The motor drive control circuit of claim 8, wherein the interpolation uses an interpolating curve.

* * * * *